Figure 1:
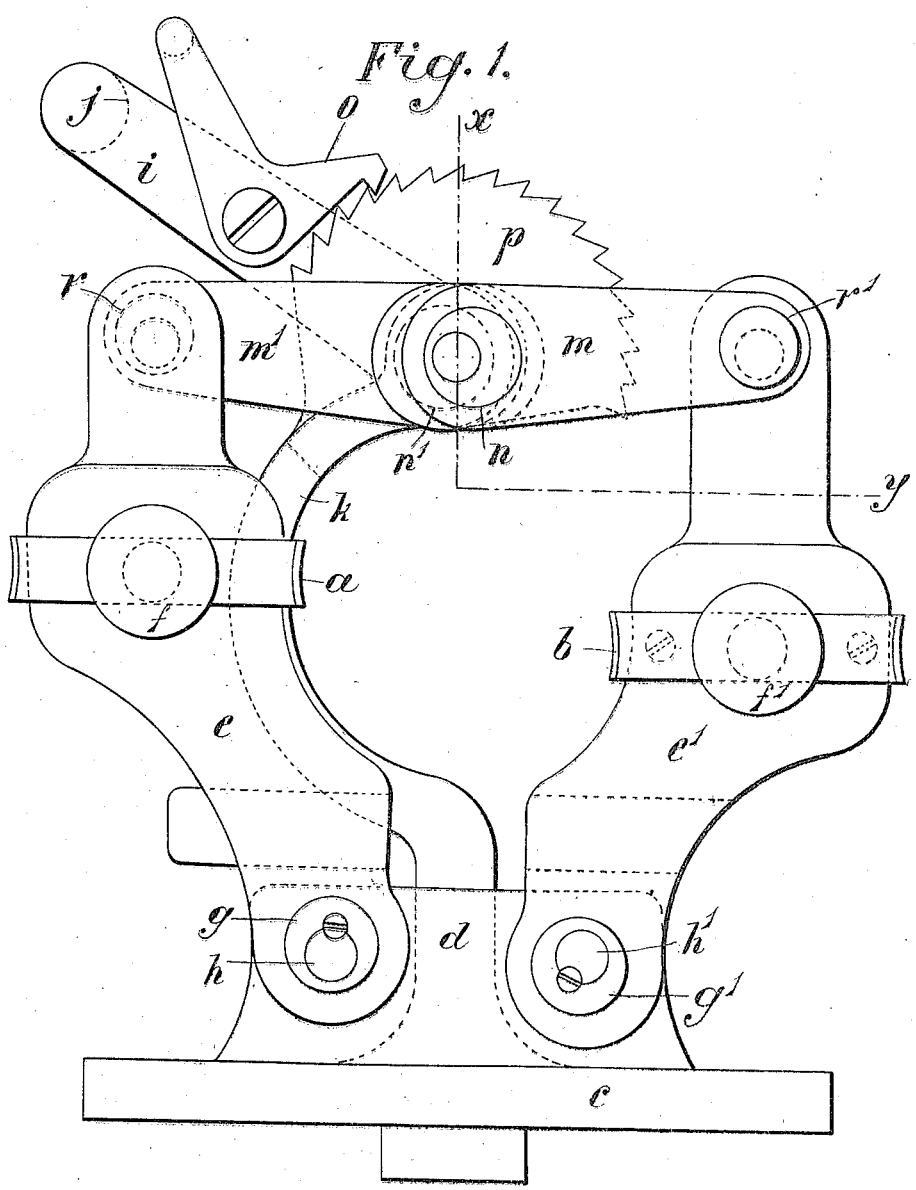

E. M. WILDEY.
DEVICE FOR CUTTING SCREW THREADS BY CHASERS.
APPLICATION FILED NOV. 21, 1917.

1,307,104.

Patented June 17, 1919.
2 SHEETS—SHEET 1.

Inventor
Edward Milton Wildey
per H. C. Heide
Attorney

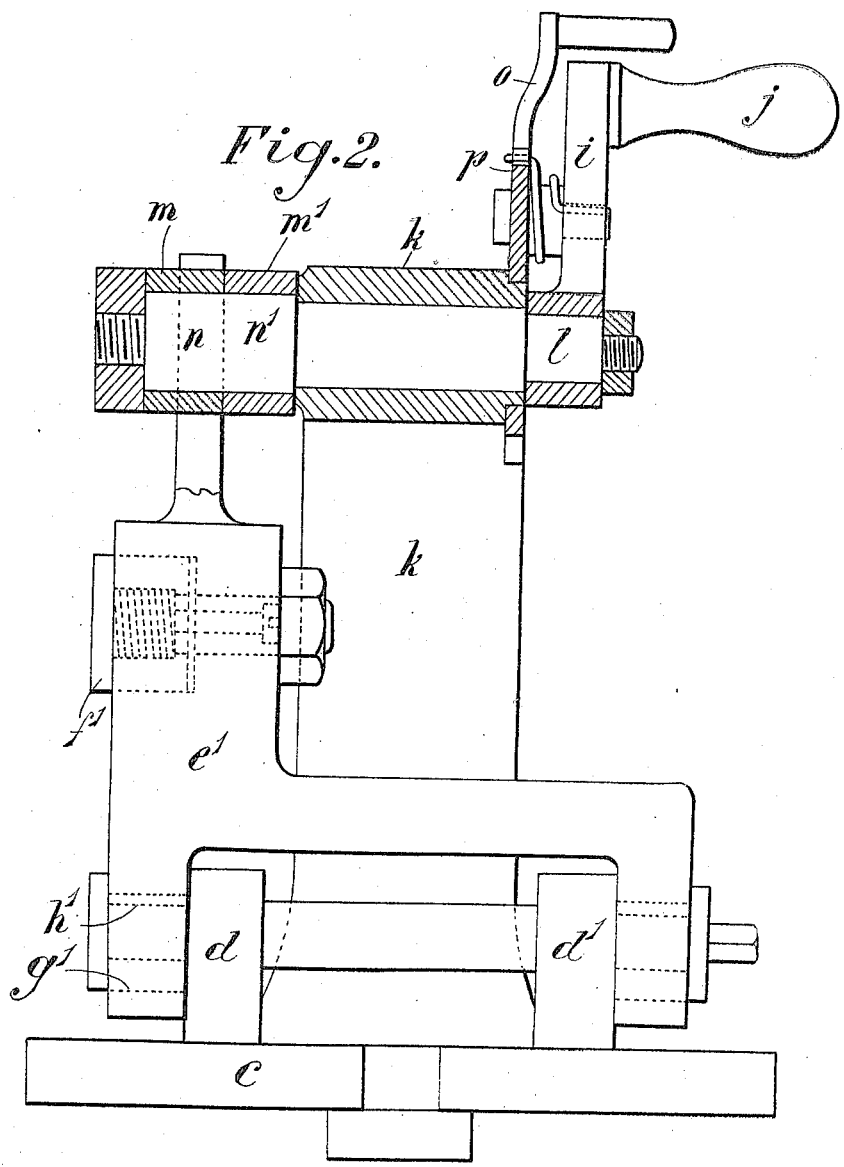

UNITED STATES PATENT OFFICE.

EDWARD MILTON WILDEY, OF CANONBURY, LONDON, ENGLAND.

DEVICE FOR CUTTING SCREW-THREADS BY CHASERS.

1,307,104.  Specification of Letters Patent.  Patented June 17, 1919.

Application filed November 21, 1917. Serial No. 203,286.

*To all whom it may concern:*

Be it known that I, EDWARD MILTON WILDEY, a subject of His Majesty King George V of the United Kingdom of Great Britain and Ireland and of the British Dominions Beyond the Sea and Emperor of India, residing at Canonbury, London, England, have invented certain new and useful Improvements in Devices for Cutting Screw-Threads by Chasers, of which the following is a specification.

The present invention relates to devices for cutting screw-threads by chasers.

An aim of the present invention is to facilitate the use of chasers for cutting screws by means of the lathe.

The invention is illustrated in the accompanying drawings, in which:—

Figures 1 and 2 show a duplex or balanced chaser holder as adapted for mounting on the saddle of the lathe, or otherwise putting under the control of the leading screw of the lathe, Fig. 1 being a side elevation in relation to the lathe and Fig. 2 a front elevation in relation to the lathe and partly in section ($x$—$y$). Fig. 1 represents a chaser holder which is advanced against the work by the action of the leading screw of the lathe and which chaser holder cuts with two chasers on the duplex or balanced system; although by occasion a single chaser may be used if desirable.

A base plate $c$ suited for bolting to the saddle of the lathe or equivalent is provided with two lugs $d$, $d'$ on which are pivotally mounted in approximately vertical position two chaser holders $e$, $e'$, one of these being in front of and the other at the back of the work to be screw-threaded. At $f$, $f'$ are represented suitable clamping devices, but any mechanical equivalent or convenient clamping device may be used. To secure the vertical adjustment of the chaser to the proper cutting position eccentrics $g$, $g'$ operated by shafts or arbors $h$, $h'$ are employed in constituting the pivotal mountings of the chaser holders $e$, $e'$; the square head or termination of the shaft or arbor $h'$ being clearly shown by Fig. 2.

The arm $i$, provided with a handle $j$, controls the distance between the chasers $a$—$b$, by drawing together or forcing apart the upper ends of the chaser holders $e$, $e'$, the intermediate mechanism being of a kind which may be varied without altering the essential character of the present invention. In the mechanism depicted the pivoting of the arm $i$ is in a crane-arm or jib-arm $k$, suitably curved to clear the work and rising from the base-plate $c$, and between the axis $l$ of the arm $i$ and the respective top of the chaser holders $e$, $e'$ are links $m$, $m'$; these links being drawn or pushed by a double eccentric system attached to the axis $l$ and shown at $n$, $n'$ Figs. 1 and 2.

$o$ is a locking device, operating into a toothed arc piece $p$, this arc piece also serving as a position indicator, but any circular scale, with pointer or equivalent device may be used in addition. A pointer or a stop may guide the operator in giving the desired depth of cut.

If chasers are used which are figured or shaped at each end as shown by $a$ and $b$ of Fig. 1, each chaser will have two positions or corners at each end which can lead in the cut, or a totality of four positions which can lead in the cut and all these leading corners may be worn down or used before the chaser is reground.

It will be understood that the chasers $a$—$b$ are brought into contact with the work by operating or bringing forward the handle $j$ and arm $i$, and are released from the work by a reverse operation. An equivalent would be a spring action to separate or "throw off" the chasers and a positive action to bring them to duty.

Supplementary eccentrics $r$, $r'$ may be employed for fine and independent horizontal adjustment of the chasers to and from the work, a coarse adjustment being allowed by the clamping device $f$, $f'$.

What I claim is:—

1. A supporting control device for chasers comprising two chaser holders each on a rocking upright, with means for the adjustment of height, and means for making the uprights to approach or recede.

2. A supporting control device for chasers comprising two chaser holders each on a rocking upright, the uprights having independent pivotal mountings, means for the adjustment of height, and means for making the uprights to approach or recede.

3. A supporting control device for chasers comprising two chaser holders each on a rocking upright, means for independent adjustment of height of the chasers, means for making the uprights to approach or recede, and supplementary means for fine and independent horizontal adjustment of the chasers to and from the work.

4. A supporting control device for chasers comprising two chaser holders each on a rocking upright with independent pivotal mounting, and means for making the uprights to approach or recede, said means comprising mechanism controlled by a lever with locking device operating into a toothed arc piece.

5. A supporting control device for chasers comprising two chaser holders each on a rocking upright, with eccentrics which serve both as means for securing the vertical adjustment of the chasers and as the pivotal mountings of the chaser holders, and means for making the uprights to approach or recede.

6. A supporting control device for chasers comprising two chaser holders each on a rocking upright, with means for the adjustment of height, means for making the uprights to approach or recede and supplementary eccentrics for fine and independent horizontal adjustment of the chasers to and from the work.

In testimony whereof, I affix my signature.

EDWARD MILTON WILDEY.

Copies of this patent may be obtained for five cents each, by addressing the "Commissioner of Patents, Washington, D. C."